United States Patent
Dabby et al.

(10) Patent No.: US 7,451,623 B2
(45) Date of Patent: *Nov. 18, 2008

(54) PARTICLE DEPOSITION SYSTEM AND METHOD

(75) Inventors: Franklin W. Dabby, Los Angeles, CA (US); Bedros Orchanian, North Hills, CA (US)

(73) Assignee: ASI/Silica Machinery, LLC, North Hills, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 10/897,784

(22) Filed: Jul. 23, 2004

(65) Prior Publication Data

US 2005/0000251 A1 Jan. 6, 2005

Related U.S. Application Data

(63) Continuation of application No. 09/894,447, filed on Jun. 28, 2001, now Pat. No. 6,789,401.

(51) Int. Cl.
*C03B 37/07* (2006.01)
(52) U.S. Cl. .............................. 65/377; 65/421; 65/435
(58) Field of Classification Search .................. 65/414, 65/421, 377, 484, 435
See application file for complete search history.

(56) References Cited

U.S. PATENT DOCUMENTS

| 4,257,797 | A | 3/1981 | Andrejco et al. |
| 4,314,837 | A | 2/1982 | Blankenship |
| 4,486,212 | A | 12/1984 | Berkey |
| 4,599,098 | A | 7/1986 | Sarkar |
| 4,810,276 | A | 3/1989 | Gilliland |
| 5,294,240 | A | 3/1994 | Sanghera et al. |
| 5,558,693 | A | 9/1996 | Sarkar |
| 6,189,340 | B1 * | 2/2001 | Burke et al. .................. 65/399 |

FOREIGN PATENT DOCUMENTS

| JP | 01242433 A | * | 9/1989 |
| JP | 02289439 A | * | 11/1990 |

(Continued)

OTHER PUBLICATIONS

Parker Motion & Control, "Compumotor Model 2100 Indexer User Guide", Copyright 1996, p. 1-1 to 2-28.*

(Continued)

*Primary Examiner*—John Hoffmann
(74) *Attorney, Agent, or Firm*—Hogan & Hartson LLP

(57) ABSTRACT

A deposition system for depositing a chemical vapor onto a workpiece, including a deposition chamber having a plurality of components for performing chemical vapor deposition on the workpiece. The deposition chamber includes an inner skin made of Hasteloy for sealing the plurality of components and the workpiece from the air surrounding the deposition system, and an outer skin that encloses the inner skin and is separated from the inner skin by an air gap. The outer skin includes vents that create a convection current in the air gap between the inner skin and outer skin of the deposition chamber. The deposition system also has a gas panel for regulating the flow of gases and vapors into the deposition chamber, and a computer for controlling operation of the gas panel and the components in the deposition chamber.

10 Claims, 7 Drawing Sheets

FOREIGN PATENT DOCUMENTS

| JP | 10081537 A | * | 3/1998 | |
|---|---|---|---|---|
| WO | WO 01/23311 A1 | * | 4/2001 | |
| WO | WO 01/23311 A1 | * | 4/2001 | ............ 65/421 |

OTHER PUBLICATIONS

Cho et al., "An experimental study of heat transfer and particle deposition during the outside vapor deposition process", International Journal of Heat and Mass Transfer, vol. 41, Issue 2, Jan. 1998, Abstract Only.*

Franklin, B., "Advice to a Young Tradesman, Written by an Old One", 1748.*

English Translation of JP01242433 to Koichi Harada, et al., Aug. 1, 2007.*

English Translation of JP 10081537 to Yukio Komura, et al., Aug.1, 2007.*

Tingye Li, "OVD Process Steps," Optical Fiber Communications, vol. 1 Fiber Fabrication, pp. 75-77 and 95, 1985.

H. C. Tsai, et al., "A Study of Thermophoretic Transport in a Reacting Flow with Application to External Chemical Vapor Deposition Processes," Department of Mechanical Engineering, University of California at Berkeley, pp. 1901-1910, 1994.

D. B. Keck, et al., "Low-Cost Fibre Fabrication," Phil. Trans. R. Soc. Lond. A 329, pp. 71-81, 1989.

Heikki Ihalainen, et al., "Soot-Overcladding Process for Enlarging Modified Chemical Vapor Deposition Preforms," Optical Engineering, vol. 34, No. 9, pp. 2538-2542, Sep. 1995.

* cited by examiner

PARTICLE DEPOSITION SYSTEM AND METHOD

PRIORITY APPLICATION

This is a continuation of application Ser. No. 09/894,447, filed Jun. 28, 2001, now U.S. Pat. No. 6,789,401, issued Sep. 14, 2004, which is hereby incorporated by reference in its entirety.

BACKGROUND OF THE INVENTION

1. Field of the Invention

The field of the present invention relates to systems and methods for depositing chemicals onto workpieces, and the products therefrom. More particularly, the present invention relates to systems and methods for depositing silica soot on a start rod for fabricating optical fiber preforms, fused silica rods, and other optical components.

2. Background

Today's communications grade optical fiber of fused silica, $SiO_2$, is manufactured according to three basic steps: 1) core preform or "start rod" fabrication, 2) core-with-cladding preform fabrication, and 3) fiber drawing. The core and cladding of a preform correspond in ratios and geometry to those of the ultimate glass fiber that is drawn from the preform. The composition of the core and cladding must be such that there is a lower index of refraction in the cladding than in the core. The relatively higher index of refraction of the core to a relatively lower index of refraction of the cladding is predetermined so that when the preform is drawn into a fiber, the fiber conducts light, either in single mode or in multi-mode form.

The first step is to build up a start rod, forming it into a glass that will eventually become the core of the fiber, and in some cases, part of the cladding layer. The start rod is a glass rod made of silica, $SiO_2$, with the portion of the start rod that comprises the core being doped with a small amount of a dopant, typically Germania, $GeO_2$. The presence of the dopant in the core increases the refractive index of the glass material compared to the surrounding outer (cladding) layer. In the second step, a cladding layer is built up on the start rod. The result of this step is a preform having a core and a cladding, which is typically about 80 mm in diameter and about one meter long. The third step is fiber drawing, where the preform is heated and stretched, and typically yields about 400 km of optical fiber.

The primary raw ingredient to fabricating the glass preform is silicon tetrachloride, $SiCl_4$, which generally comes in a liquid form. As noted above, however, $SiO_2$, typically in the form of glass soot, is deposited on the start rod. The chemical reactions involved in the formation of the glass soot are complex, involving, $SiCl_4$, oxygen, $O_2$, and the fuel gas combustion products. In all of the techniques, the silica, $SiO_2$, comprises the cladding of the preform according, generally, to the reaction:

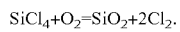

$$SiCl_4 + O_2 = SiO_2 + 2Cl_2.$$

Generally, there are four distinct technologies for fabricating core preforms. These technologies include Modified Chemical Vapor Deposition (MCVD), Outside Vapor Deposition (OVD), Vapor Axial Deposition (VAD), and Plasma Chemical Vapor Deposition (PCVD). The resulting product for all of these technologies is generally the same: a "start rod" that is generally on the order of one meter long and 20 mm in diameter. The core is generally about 5 mm in diameter.

Similarly, there are generally four technologies for performing the step of adding the cladding. These technologies include tube sleeving (conceptually paralleling MCVD), OVD soot overcladding (conceptually paralleling OVD), VAD soot overcladding (conceptually paralleling VAD), and plasma (conceptually paralleling PCVD). In this step, additional cladding layers of pure or substantially pure fused silica are added to the start rod to make a final preform that can be prepared for fiber drawing.

In MCVD, the step of manufacturing the start rod is performed inside of a tube. Similarly, when the cladding step is performed, a larger tube is sleeved onto and fused to the start rod. Presently, the company, Heraeus, manufactures the tubes used for producing start rods and for sleeving onto and fusing with the start rods to make the preforms.

In OVD, when fabricating start rods, glass is deposited onto a rotating mandrel in a "soot" deposition process. The start rod is slowly built up by first depositing the germanium doped core, and then the pure silica layers. When the core deposition is completed, the mandrel is removed and then sintered into a start rod of glass.

In the process of OVD soot overcladding, where a cladding is deposited onto a fabricated start rod, the start rod is rotating and traversing on a lathe such that many thin layers of soot are deposited on the rod over a period of time. Although the $SiO_2$ is not deposited onto the start rod as a vapor, but rather as $SiO_2$ particles, the process is known in the art as a "chemical vapor deposition" process because the $SiCl_4$, which reacts in the stream between the burner and the start rod to form $SiO_2$, is input to the burner as a vapor. The porous preform that results from the OVD soot overcladding process is then sintered in a helium atmosphere at about 1500° C., into a solid, bubble-free glass blank. U.S. Pat. No. 4,599,098, issued to Sarkar, which is incorporated by reference as though fully set forth herein, provides further background on systems and techniques for OVD and OVD soot overcladding.

VAD is a process of depositing silica soot onto the end of a mandrel in a deposition station. Unlike the OVD process the mandrel is not removed prior to sintering. Furthermore, like the OVD soot overcladding technique, VAD soot overcladding is also used to deposit silica soot on a start rod to fabricate a preform. However, unlike OVD and OVD soot overcladding, VAD soot overcladding orients the mandrel and start rod vertically rather than horizontally and deposits the silica in one thick layer in one pass.

PCVD uses plasma radiation as a source of heat, and therefore is unlike the above-described processes, which use hydrogen or methane as the source of heat for the chemical reaction.

For the above-described technologies, typically any one of the core fabrication technologies may be combined with any one of the cladding fabrication technologies to generate a preform that may be used for drawing fiber.

In the OVD soot overcladding processes, one of the key measures of economic viability in comparison to the other available techniques is the deposition rate of the $SiO_2$ on the workpiece. For example, some companies involved in optical fiber manufacturing opt for the most cost-effective method of performing the step of overcladding the start rod in the fiber manufacturing process. With respect to this step in the process, the choice is either to purchase the cladding tubes or to perform a deposition process to add the cladding.

In comparing the relative costs of the two approaches, the economics often come down to whether a particular vapor deposition system that a company is considering performs at a certain minimum deposition rate. The deposition rate may be characterized, for example, by the average grams/minute of silica soot that can be deposited on the start rod until completion (i.e., an optical fiber preform ready for sintering). Thus, above a certain threshold deposition rate, performing the soot overcladding process is likely to be economically more attractive to the company than purchasing cladding tubes. Thus, companies that manufacture systems for performing soot overcladding focus on achieving the highest possible deposition rates without compromising the quality of the preform that is produced for fiber drawing.

The factors that determine a deposition system's deposition rate are the chemical vapor delivery rate and the efficiency of chemical vapor deposition onto the workpiece. With respect to vapor delivery, key issues generally revolve around continuously and efficiently maintaining a high (e.g., greater than 200 grams/minute) delivery rate over a prolonged period (e.g., greater than 2 hours). Several methods have been described in the prior art for supplying a hydrolyzing burner with a substantially constant flow of vaporized source material entrained in a carrier gas. For example, in U.S. Pat. No. 4,314,837 issued to Blankenship ("the Blankenship reference"), a system is described that includes several enclosed reservoirs each containing liquid for the reaction product constituent. The liquids are heated to a temperature sufficient to maintain a predetermined vapor pressure within each reservoir. Metering devices are coupled to each reservoir for delivering vapors of the liquids at a controlled flow rate. The respective vapors from each reservoir are then combined before they are delivered to the burner.

This device, however, is inefficient for maintaining a substantial and steady delivery rate of chemical vapor to the burner for a prolonged chemical vapor deposition process. For a substantial and steady delivery rate, the chemical reservoir described in the Blankenship reference must be vast, and significant energy expenditure is required to maintain the chemical in the reservoir in a vapor state. On the other hand, if the chemical reservoir described in the Blankenship reference is small enough to be energy-efficient, then the deposition flow must be periodically interrupted to refill the reservoir with the chemical liquid and heat the chemical until it is in a vapor state. Because maintaining a constant, high delivery flow rate, as noted above, is a critical factor in the effective deposition rate, a need exists for a system and method of chemical vapor delivery that is energy-efficient and provides high, constant and continuous delivery of chemical vapor.

With respect to enhancing the deposition efficiency of $SiO_2$ on the workpiece to improve the effective deposition rate, studies have been performed to characterize the flow of chemical vapor in the reaction chamber from the burners to the surface of the workpiece. One reference directed to this issue is Li, Tingye, Fiber Fabrication, pp. 75-77, *Optical Fiber Communications*, (Academic Press, Inc. 1985). As discussed in the above reference, because of the small size of the formed glass particles, momentum does not cause an impaction of the particles onto the surface of the workpiece. The small sizes of the glass particles would tend to force them to follow the gas stream around instead of at the preform surface. Rather, thermophoresis is the dominant mechanism for collection on the surface of the preform. As the hot gas stream and glass particles travel around the workpiece, a thermal gradient is established near the surface of the preform. Preferably, the thermal gradient is steep, effectively pulling the glass particles by a thermophoretic force towards the preform.

Various methods have been proposed to increase deposition efficiency based on establishing and maintaining the thermophoretic force, including varying the distance between the burner and the workpiece. See H. C. Tsai, R. Greif and S. Joh, "A Study of Thermophoretic Transport In a Reacting Flow With Application To External Chemical Vapor Deposition Processes," *Int. J. Heat Mass Transfer*, v. 38, pp. 1901-1910 (1995). However, even applying these methods, demand for even higher deposition rates has gone unmet. A need exists therefore, for systems and methods that offer further improvement to deposition efficiency, chemical delivery and, thereby, the overall deposition rate of chemical vapor.

SUMMARY OF THE INVENTION

The present invention generally provides, in one aspect, systems and methods for enhancing the effective deposition rate of chemicals onto a workpiece, such as the deposition of $SiO_2$ from a $SiCl_4$ vapor onto a start rod for making a preform usable for drawing into optical fiber.

In a second separate aspect as described herein, the present invention comprises systems and methods for manufacturing optical fiber preforms, optical fiber, silica rods, including fused silica rods, and silica wafers.

In a third separate aspect as described herein, the present invention comprises a deposition system that preferably includes a deposition chamber having a plurality of components for performing chemical vapor deposition on the workpiece, an inner skin made of a Nickel-Chromium-Molybdenum alloy, commonly referred to as Hasteloy, for sealing the plurality of components and the workpiece from the air surrounding the deposition system, and an outer skin enclosing the inner skin and preferably separated from the outer skin by an air gap. The deposition system also has a gas panel for regulating the flow of gases and vapors into the deposition chamber, and a computer for controlling operation of the gas panel and the components in the deposition chamber.

In a fourth separate aspect as described herein, the present invention comprises a deposition system that preferably includes a deposition chamber comprised of Hasteloy and including components for performing chemical vapor deposition on the workpiece, a gas panel for regulating a flow of gases and vapors into the deposition chamber, and a computer for controlling operation of the gas panel and at least one of the plurality of components.

In a fifth separate aspect as described herein, the present invention comprises a deposition system that preferably includes a burner for depositing particles onto the workpiece and a lathe for holding the workpiece at its two ends and for rotating and translating the workpiece relative to the burner. The deposition system preferably further includes a computer for controlling the translating and rotating of the workpiece relative to the burner. Preferably, the computer is configured to translate the workpiece relative to the burner at a rate of greater than about 1.4 meters per minute during at least a portion of the deposition process. This relative motion may be caused by translating the burner, translating the workpiece, or translating both.

In a sixth separate aspect as described herein, the present invention comprises an optical fiber preform formed using deposition system such as that described above in the fourth separate aspect of the invention. In a seventh separate aspect as described herein, the present invention comprises a silica rod, preferably formed of substantially pure fused silica, and formed using deposition system such as that described above in the fourth separate aspect of the invention.

In an eighth separate aspect as described herein, the present invention comprises a deposition system that preferably includes a deposition chamber including components for performing chemical vapor deposition on the workpiece. The deposition system preferably further includes an exhaust subsystem for exhausting constituents from the deposition chamber, and an intake subsystem for providing air into the deposition chamber. The intake subsystem preferably includes a blower for actively conveying air into the deposition chamber and a passive air intake for allowing air into the deposition chamber based on a negative pressure differential between the blower and the exhaust subsystem.

In a ninth separate aspect as described herein, the present invention comprises a system of chemical vapor delivery, where the system includes a reservoir, a preheater, and a vaporizer generally connected in series for transferring silicon tetrachloride ($SiCl_4$) in liquid form from the reservoir to the preheater, in which the $SiCl_4$ is initially heated. The $SiCl_4$ is then transferred from the preheater to the vaporizer where the $SiCl_4$ is vaporized. Preferably, the system further includes a valve interposed between the preheater and the vaporizer, and a computer electrically connected to the valve for controlling flow of the chemical into the vaporizer based on the amount of the chemical in the vaporizer.

Further embodiments as well as modifications, variations and enhancements of the invention are also described herein.

DETAILED DESCRIPTION OF THE PREFERRED EMBODIMENTS

Figure 1A:
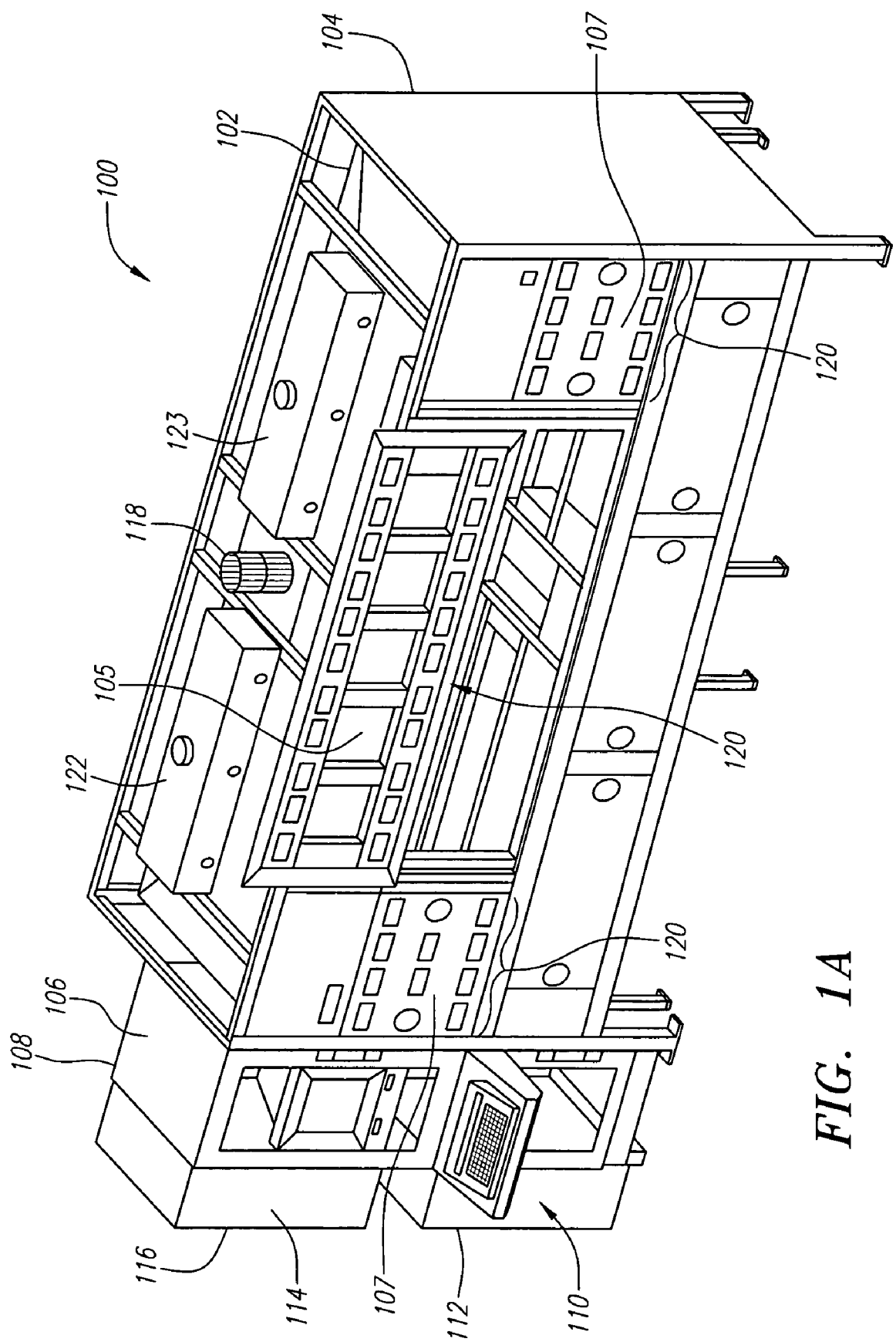
FIG. 1A is a schematic diagram of a perspective view of a preferred embodiment of a chemical vapor deposition system.

FIG. 1A depicts a preferred embodiment of a chemical vapor deposition system 100. The chemical vapor deposition system 100 preferably includes a reaction or deposition chamber 102, and a enclosure 104 for the deposition chamber 102, a computer 106 and other electronic components, an enclosure 108 for the computer 106 and the other electronic components, a power distribution subsystem 110, an enclosure 112 for the power distribution subsystem 110, a gas panel 114, a gas panel enclosure 116 and an intake and exhaust subsystem (see FIG. 1B), including a main exhaust 118 and secondary exhausts 122, 123. A door 105 is preferably provided through which a workpiece or start rod can be inserted into and removed from the deposition chamber 102. Removable panels 107 are also provided to facilitate cleaning of the chamber 102. The door 105 and panels 107 preferably include moldings to seal the chamber 102 from vapor leakage out or air leakage into the chamber 102. Overhead lights (not shown) preferably on each side of the chamber 102 may be provided to illuminate the interior of the chamber 102.

Generally, the deposition chamber 102 is structured to house a process of deposition of particles (e.g., particles of silica soot) onto a workpiece or start rod. The deposition chamber 102, and the deposition system 100 generally, may be used to produce an optical fiber preform that, in a subsequent drawing step, may be used to manufacture optical fiber. The deposition system 100 may also be used to manufacture fused silica rods, including pure fused silica rods. For this application, the deposition system 100 generally applies silica soot to an initial start rod of substantially pure fused silica. The product of this deposition process, a pure fused silica preform, is then sintered to form the pure fused silica rod and may be used to manufacture (e.g., by drawing, slicing or otherwise reforming the pure fused silica rod) silica wafers or substrates, multi-mode optical fiber, and other optical components for a variety of applications.

The other subsystems and components of the deposition chamber 102 are generally provided to support the deposition process. In one embodiment, deposition material generally comprising a vapor of silicon tetrachloride ($SiCl_4$) and oxygen ($O_2$) is emitted from a chemical burner in a process of fabricating optical fiber preforms in a deposition region 146 (see FIG. 1B) of the deposition chamber 102. In the deposition region 146 are the chemical burner, a chemical stream from the burner, and the workpiece, where the stream is directed towards the workpiece from the burner (see FIG. 2). The burner also preferably issues and ignites streams of hydrogen and oxygen. The resulting flame heats the chemical constituents to temperatures generally exceeding about 1000° C. A chemical reaction with the hydrogen, oxygen and $SiCl_4$ occurs in the stream, in which the $SiCl_4$ in the stream is oxidized producing particles of silicon dioxide (that are then deposited on the workpiece) and a byproduct of hydrogen chloride (HCl).

Figure 1B:
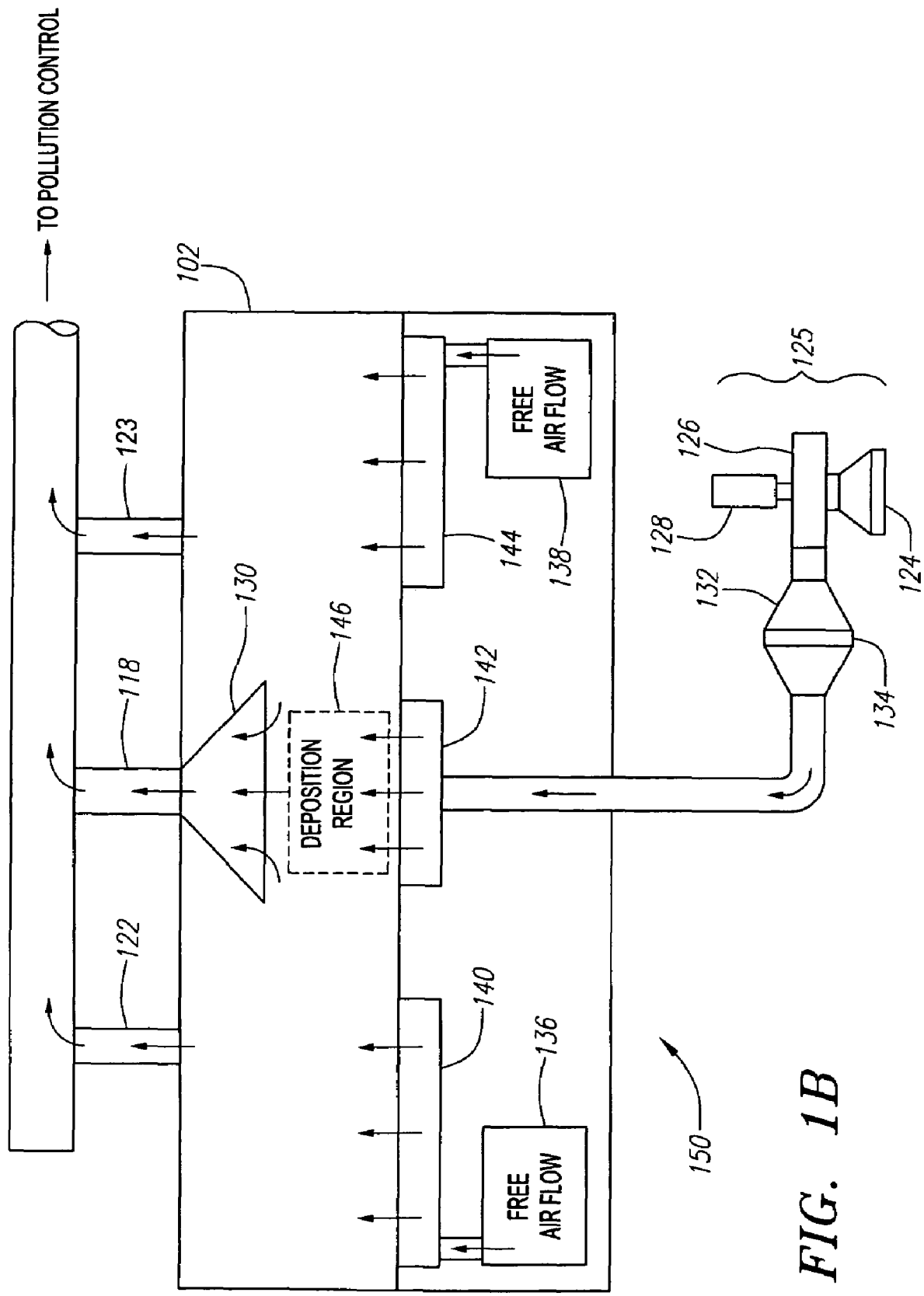
FIG. 1B is a diagram of a preferred embodiment of an intake and exhaust subsystem such as may be provided by the chemical vapor deposition system depicted in FIG. 1A.

FIG. 1B depicts a preferred embodiment of an air intake and exhaust subsystem 150 such as may be provided in the chemical vapor deposition system 100 illustrated in FIG. 1A. Containment and processing of the constituents of the chemical vapor deposition process preferably is, at least in part, provided by the intake and exhaust subsystem 150. The intake and exhaust subsystem 150 preferably provides a flux of air through the deposition chamber 102 to keep the deposition chamber environment, and the thereby the workpiece, cool relative to the chemical stream that issues from the burner.

As illustrated in FIG. 1B, the intake and exhaust subsystem 150 preferably is configured to cool the deposition chamber and the workpiece, provide clean air and a negative pressure within the deposition chamber 102, and provide a laminar air flow in the deposition region 146. The intake and exhaust subsystem 150 preferably includes a blower 125, comprising a fan 126 and a motor 128, a prefilter 124, a High Efficiency Particulate Air (Hepa) filter 134 and a Hepa filter interface 132, air diffusers 140, 142, 144, and passive air intakes 136, 138. The exhaust elements preferably include an exhaust hood 130, a main exhaust 118, and secondary exhausts 122, 123.

With respect to the air intake elements, air external to the deposition system 100 enters the prefilter 124 under the active power of the blower 125. The prefilter 124 preferably has an efficiency of at least about 90% in removing contaminants from the external air. Furthermore, the prefilter 124 preferably is mounted into the intake and exhaust subsystem 150 to conveniently enable an operator to periodically replace the prefilter 124. External air that passes through the prefilter 124 is then preferably forced through the Hepa filter 134, via a connector 132. The Hepa filter 134 preferably has a filtering efficiency of greater than about 95% and, due to the presence of the prefilter 124, requires replacement infrequently.

The forced clean air exiting the Hepa filter 134 is preferably piped to a location beneath the chemical burner where the air is spread laterally by a central diffuser 142 into the deposition region 146. The forced clean air may be conveyed via stainless steel tubing (e.g., six-inch diameter) or via other convenient means as are known in the art. From the central diffuser 142, the air is directed upward through the deposition region 146 towards the workpiece and the exhaust hood 130, and in an upward direction generally parallel to the chemical stream emitted from the burner.

Due to the preferably negative pressure within the deposition chamber 102, outside air also passively enters the deposition chamber 102 through the passive air intakes 136, 138. The passive air intakes 136, 138 preferably include filters similar in design and filtering efficiency to the prefilter 124. From the passive air intakes 136, 138, the filtered external air then enters the diffusers 140, 144 which laterally spread the generally upward movement of air in the deposition chamber 102. In the embodiment shown in FIG. 1B, one passive air intake is provided on each side of the deposition region 146. In alternative embodiments, additional intakes may be provided on each side of the deposition region 146. Alternatively, one passive air intake may be provided which diffuses the air laterally to both sides of the deposition chamber 102. In any event, passive intake of external air is preferably balanced on each side of the deposition region 146.

A generally vertical flow of air in the deposition chamber 102 is preferably at least in part maintained by the exhaust component of the intake and exhaust subsystem 150. The main exhaust 118 and the secondary exhausts 122, 123 encourage a generally upward flow of air into and out of the deposition chamber 102. Although the exhaust hood 130 may perturb the vertical flow somewhat, the exhaust hood 130 minimizes the spread of chemicals to interior walls 104 of the deposition chamber 102 by generally capturing any chemical constituents immediately after they move past the workpiece or otherwise escape the deposition region 146. Like the passive air intakes 136, 138, a secondary exhaust 122, 123 is preferably provided on each side of the main exhaust 118 to encourage the generally upward flow of air in the chamber 102. In alternative embodiments, additional secondary exhausts may be provided on each side of the main exhaust 118.

In one embodiment, the main exhaust 118 is preferably an eight-inch diameter stainless steel duct and the secondary exhausts 122, 123 preferably comprise six-inch diameter stainless steel ducts. However, the intakes and exhausts as described herein may be of any convenient shape or diameter for maintaining the desired laminar flow of air through the chamber 102. Preferably, however, the exhaust hood 130 and the main exhaust 118 are comprised of Hasteloy to minimize any potential for corrosion due to the exhaust of chemicals from the chamber 102. Furthermore, optionally, the secondary exhausts 122, 123 also are comprised of Hasteloy.

The intake and exhaust subsystem 150 preferably provides a power differential between the intake and exhaust of air from the deposition chamber 102 such that a greater flux of air is forced out of the chamber 102 than is forced into the chamber 102. For example, the intake and exhaust subsystem 150 may be configured to exhaust 2000 cubic feet per minute (CFM) of air and deposition chamber constituents from the deposition chamber 102, while the blower 125 may force 500 CFM of filtered air into the deposition chamber 102. The resulting pressure differential is preferably addressed by the plurality of passive air intakes 136, 138 that passively allow filtered external air into the deposition chamber 102.

In this embodiment, the exhaust component of the subsystem 150 inherently is provided an allowance for sub-optimal performance, as long as it exhausts air and chemical constituents at a greater rate than the active air intake component of the subsystem 150 (i.e., the blower 125) drives air into the chamber 102. Potentially dangerous fumes from the deposition chamber 102 are therefore controlled efficiently and at low cost compared to a subsystem that may be designed to precisely balance between intake and exhaust. Furthermore, according to this embodiment, the deposition system 100 may be compatible with a greater variety of exhaust implementations, in that such exhaust implementations only need to meet certain minimum exhaust requirements related to a relatively low active air intake specification. Such flexibility in permissible exhaust performance is particularly advantageous because the intake and exhaust subsystem 150 may be only partially design-integrated with the rest of the deposition system 100, where an exhaust motor for the intake and exhaust subsystem 150 is supplied externally. For example, the deposition system 100 may be connected to the exhaust fixtures, including the exhaust motor, of a building or other structure that houses the deposition system 100.

The intake and exhaust subsystem 150 preferably provides a laminar flow of air in the deposition region 146. The laminar flow provided by the intake and exhaust subsystem 150 preferably assists in maintaining a focused stream of heat and chemical vapor from the burner towards the workpiece. A narrow and tight stream of flame enhances the thermophoretic effect that attracts the $SiO_2$ particles to the workpiece because the $SiO_2$ particles get hotter while the surface of the workpiece remain relatively cooler.

The enclosure 104 for the deposition chamber 102 preferably is comprised of preferably two "skins" or sets of walls that enclose the components that perform the deposition process. An inner skin of the two skins encloses the deposition components and is preferably entirely comprised of Hasteloy. Hasteloy is preferably used for the inner skin because of its chemically resistive properties at high temperatures. In an alternative embodiment, the inner skin of the enclosure 104 is comprised of stainless steel and has its interior walls lined with Hasteloy. In yet another alternative embodiment, the inner skin of the enclosure 104 is comprised of stainless steel with an interior lining of Teflon. Stainless steel, however, has generally been observed to rust due to the presence of HCl in the reaction chamber. Furthermore, the lining of Teflon generally may begin to peel from the steel surface at temperatures above about 420° C.

The outer skin of the enclosure 104 preferably is separated from the inner skin by an air gap, and preferably completely encases the inner skin. Alternatively, the outer skin encases a portion of the inner skin that is most exposed to the heat inside the deposition chamber. The outer skin is preferably formed of stainless steel, stainless steel lined with Hasteloy, stainless steel lined with Teflon, or another convenient material or combination of materials. The outer skin is preferably not substantially exposed to corrosive chemicals like the inner skin, so any of the above alternative compositions may be conveniently selected. The outer skin preferably includes numerous vents 120 to cool the inner skin of the enclosure 104 and otherwise prevent the deposition chamber 102 from overheating. In one alternative embodiment, the air gap between the outer skin and the inner skin is actively cooled. FIG. 1A depicts the vents 120 on a front side of the enclosure 104, on the door 105 and on the removable panels 107 of the deposition system 100. Preferably, a similarly configured array of vents 120 is provided on the opposing side of the enclosure 104 of the deposition system.

Large quantities of oxygen ($O_2$) and fuel gas, typically in the form of hydrogen ($H_2$) or natural gas, are passed through the deposition chamber 102 to enable the deposition process of converting $SiCl_4$ into $SiO_2$ soot that is deposited in layers onto a workpiece. During the deposition process, even with the continuous flow of air, the inner skin of the enclosure 104 rapidly heats up. Due to the preferably advantageous heat transfer properties of the inner skin, heat in the deposition chamber 102 is preferably conducted to the inner skin's outer surface. The high temperature of the inner skin's outer surface generally causes the air between the inner skin and the outer skin to heat. The vents 120 on the outer skin preferably enable cooler air outside the deposition system 100 to enter one or more vents 120, and enable the hotter air in the air gap between the two skins to exit other vents 120.

In a preferred embodiment, the vents 120 are positioned in at least two rows, including an upper and a lower row. External air preferably enters the lower row of vents 120 and hot air exits the upper row of vents 120. By funneling hot air out of the air gap between the two skins of the enclosure 104, heat is effectively transferred out of deposition chamber 102, through the inner skin, and out through the vents 120 on the outer skin of the enclosure 104. Consequently, maintaining the temperature of the workpiece in the deposition chamber 102 is furthered, so that the average temperature of the workpiece is preferably significantly lower than the temperature of the silica soot particles that are expelled from the burner. Typically, the temperature of the workpiece is greater than but follows the temperature of the deposition chamber. Thus, an increased thermal gradient between the hot silica soot particles and the cooler workpiece is provided than may exist without the vents 120, enabling an increased thermophoretic force that attracts the silica soot particles to the surface of the cooler workpiece.

Figure 2:
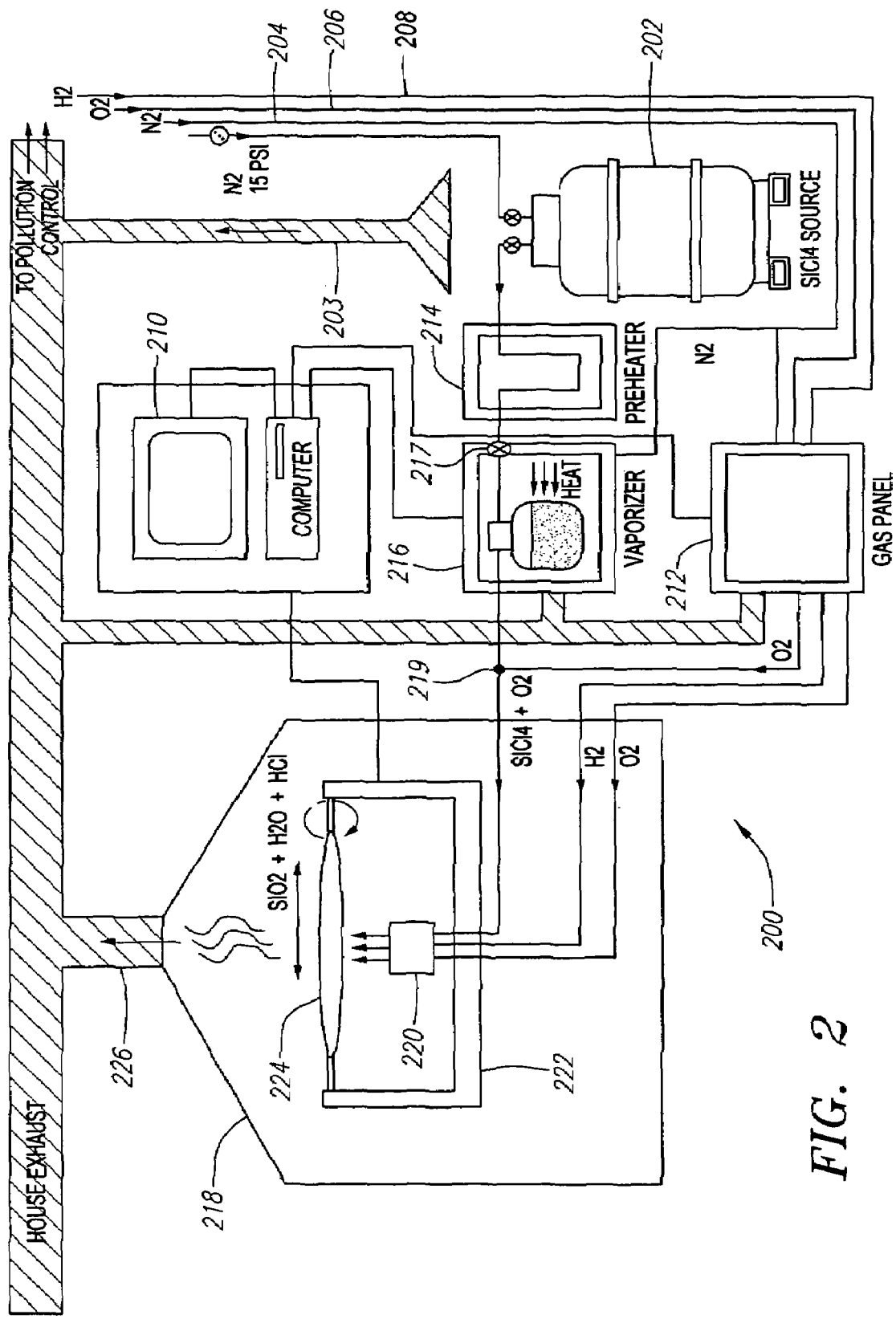
FIG. 2 is a function-oriented diagram of a preferred embodiment of a chemical vapor deposition system.

FIG. 2 is a diagram depicting a functional view of the chemical vapor deposition system 100 generally shown in FIG. 1. As depicted in FIG. 2, the chemical vapor deposition system 200 preferably includes a $SiCl_4$ source 202, a nitrogen ($N_2$) source 204, an oxygen ($O_2$) source 206, and an $H_2$ source 208 as raw materials for the vapor deposition system 200. Alternatively, the $N_2$, $O_2$, and $H_2$ sources 204, 206, 208 may be piped in from an external location. The deposition system 200 preferably further includes a computer 106, 210, a gas panel 114, 212, a preheater 214, and a vaporizer 216 for controlling the flow of the materials used for the deposition process.

The deposition system 200 preferably includes a deposition chamber or cabinet 218, enclosing one or more, and preferably two chemical burners 220, a lathe 222 for holding a workpiece 224 and for moving the workpiece 224 rotationally and translationally relative to the one or more burners 220. The deposition chamber 218 preferably encloses one or more end-torches (not shown) positioned near the ends of the workpiece 224, and which move with the workpiece 224 (in an embodiment in which the workpiece 224 moves and the chemical burner 220 remains stationary). The end torches preferably direct heat to the ends of the workpiece 224 to prevent it 224 from breaking and/or cracking. Preferably, the workpiece 224 and the end torches move so that the exhaust around the chemical burner 220 is relatively constant. Alternatively, the chemical burner 220 is moving and the workpiece 224 and end torches are stationary (except for the rotation of the workpiece 224). The deposition system 200 preferably further includes an air intake and exhaust subsystem 150, 226 including scrubbers (not shown) and other pollution control devices for removing and collecting the gasses and vapors that are expelled by the deposition system 200.

The computer 106, 210 preferably includes electronic connections to the vaporizer 216, the gas panel 212, and the deposition cabinet 218 for automatically controlling functions of each component. The computer 106, 210 preferably further includes a connection to a user-input device such as a keyboard, touch screen, knobs, buttons, switches, mouse and/or microphone for voice activated command input for providing operational control of the deposition system 200 to a user. Moreover, the computer 106, 210 preferably includes a user output device, such as a display monitor or speaker for presenting a status of the system.

The raw deposition materials' sources 202, 204, 206, 208 are preferably reservoirs, which may be commercially available pressurized tanks for containing each constituent material. The $SiCl_4$ preferably is contained in a reservoir in liquid form, preferably at room temperature. The $SiCl_4$ source 202 preferably is connected by a pipe or line to the preheater 214, such that $SiCl_4$ may be conveyed as a liquid into the preheater 214. Preferably, positioned above the $SiCl_4$ source 202 is an exhaust port 203 to convey $SiCl_4$ to a pollution control system (not shown) in event of a leak of $SiCl_4$ from its source 202.

Preferably, $N_2$ is used to maintain a pressure of preferably about 15 PSI on the $SiCl_4$ source 202 to enable flow of $SiCl_4$ out of the $SiCl_4$ source 202 and into the preheater 214. Generally, $N_2$ is used throughout the deposition system 200 during non-operation to purge the components of the corrosive chemicals, such as HCl and $SiCl_4$, which are used or produced when the deposition system 200 is in operation.

The preheater 214 preferably is a commercially available device comprising a container for holding small volumes of $SiCl_4$ and may include a heating element such a heating blanket around the container or a coil in the container for heating the liquid form of $SiCl_4$. Alternatively, the preheater 214 may be a long line wrapped in heating tape that heats the flowing $SiCl_4$ liquid to a desired temperature before it reaches the vaporizer 216. Preferably, the preheater 214 receives the $SiCl_4$ liquid at preferably room temperature and heats the $SiCl_4$ liquid to a temperature of preferably about 50° C. Preferably, the preheater 214 maintains a substantially constant level of $SiCl_4$ in its container throughout an operation of the deposition process. The preheater 214 is connected to the vaporizer 216 for transferring the heated $SiCl_4$ liquid out of the preheater 214 and into the vaporizer 216.

The vaporizer 216 preferably is a commercially available device that comprises a container for containing a substantial volume of $SiCl_4$, a heating element to heat the $SiCl_4$ in the container, and numerous valves (not shown) to regulate the flow of materials into and out of the vaporizer 216. The vaporizer 216 preferably heats the $SiCl_4$ to a temperature of between about 70° C. and about 80° C. Preferably, the $SiCl_4$ is heated until it is boiling in the vaporizer 216. The variation in temperature between about 70° C. and about 80° C. for the vaporized $SiCl_4$ preferably depends on the mass flow rate of $SiCl_4$ vapor that is required at the burner 220 for the deposition process. Higher temperatures generally provide higher mass flow rates.

The vaporizer 216 is preferably electronically connected to the computer 210. Through this electronic connection, the volume of $SiCl_4$ in the vaporizer 216 is preferably regulated and maintained between a minimum and maximum level. The computer 210 preferably controls the flow of $SiCl_4$ liquid from the $SiCl_4$ source 202 to the vaporizer 216 from a solenoid valve 217 preferably located at or near the pneumatic input to the vaporizer 216.

The vaporizer 216 is also pneumatically connected by a line to the $N_2$ source 204. As a generally inert gas, the $N_2$ preferably is used in the vaporizer 216 both to purge parts of the vaporizer 216 of $SiCl_4$ when the deposition system 100, 200 is not in operation and to actuate deposition system's numerous pneumatic valves. Through control from the computer 210, the $SiCl_4$ source 202, the preheater 214 and the vaporizer 216 preferably provide a constant, automatic and prolonged flow of vaporized $SiCl_4$ from the vaporizer 216 to the one or more burners 220 in the deposition cabinet 218. This characteristic of constant flow only ceases when and if the $SiCl_4$ source reservoir 202 is emptied.

A constant flow of preferably 100% $SiCl_4$ vapor out of the vaporizer 216 to the burner 220 is provided because the vaporizer 216 is preferably automatically refilled from the preheater 214 by the computer 210 without disrupting the flow of vaporized $SiCl_4$ from the vaporizer 216 to the burner 220. The preheater 214 allows the vaporizer 216 to maintain the $SiCl_4$ contained within the vaporizer 216 at a temperature necessary to have vaporized $SiCl_4$ output from the vaporizer 216 at all times during operation of the deposition system 100, 200. When the level of $SiCl_4$ in the vaporizer 216 drops below a predetermined minimum level, the computer 210 actuates the valve 217 controlling input of $SiCl_4$ to allow heated $SiCl_4$ into the vaporizer 216 from the preheater 214. This valve 217 is then preferably closed when a predetermined maximum level of $SiCl_4$ is reached in the vaporizer 216. To maintain the temperature of the $SiCl_4$ from the vaporizer 216 to the burner 220, the line between the vaporizer 216 and the burner 220 for transferring the $SiCl_4$ vapor is preferably heated, such as with heating tape, to maintain the $SiCl_4$ as a vapor as the $SiCl_4$ is conveyed to the burner 220. Because the $SiCl_4$ is a vapor, mass flow controllers (MFCs) preferably are used to regulate the flow as controlled by the computer 210.

The gas sources 204, 206, 208 are preferably pneumatically connected to the gas panel 212. The gas panel 212 includes valves and MFCs to regulate the flow of gasses from the gas sources 204, 206, 208. Control of the valves in the gas panel 212 is provided by the computer 210, which is electronically connected to the gas panel 212. Lines for $O_2$ and $H_2$ are provided to pneumatically connect the gas panel 212 and the burner 220 in the deposition cabinet 218. Further, a separate line is preferably provided to convey $O_2$ to the line carrying the vaporized $SiCl_4$ to the burner 220. Thus, at a "T" fitting 219, the vaporized $SiCl_4$ and $O_2$ are mixed, and continue as a mixture in their transport to the burner 220. Preferably, the $O_2$ line exiting from the gas panel 212 to the "T" fitting 219 is similarly heated using any convenient means such as heating tape. Thus, the mixture of $O_2$ and $SiCl_4$ from the "T" fitting 219 to the burner 220 is maintained at a temperature such that the $SiCl_4$ at least remains a vapor, and preferably may have a temperature at about or above 100° C. as it approaches the burner 220.

Figure 3A:
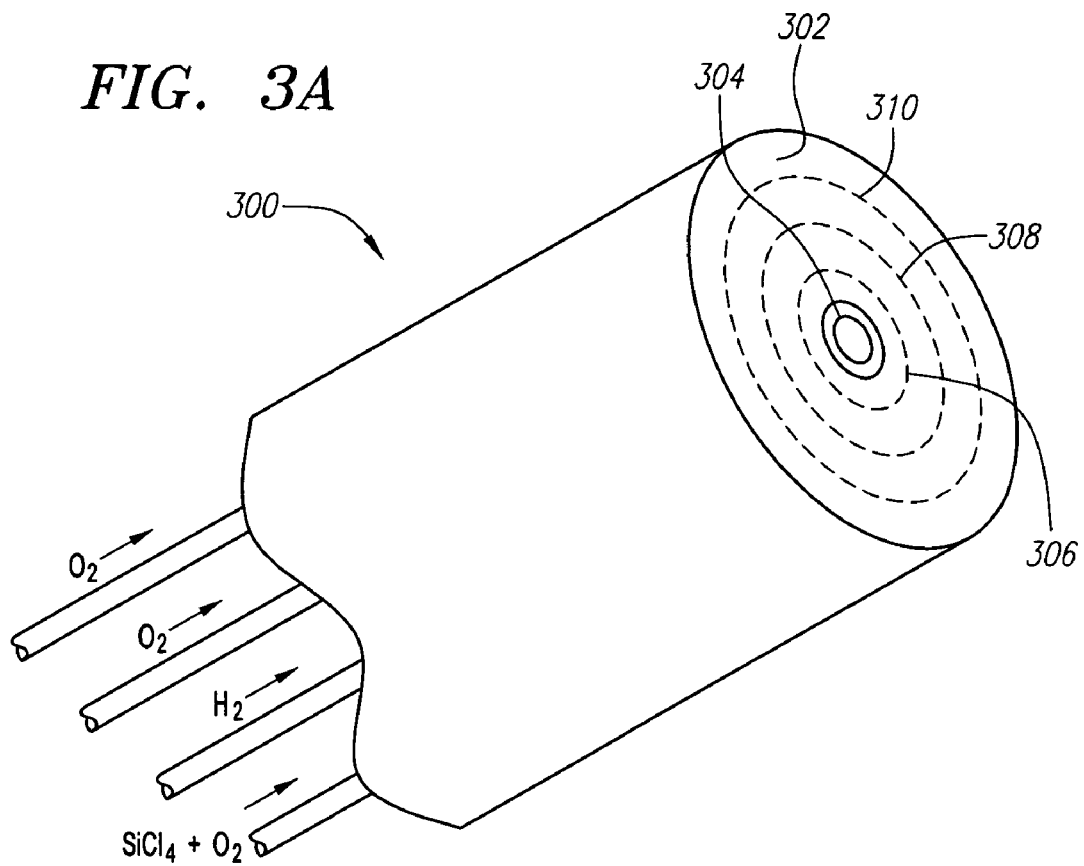
FIG. 3A is a diagram of a functional representation of a burner, represented generally in FIG. 2, as used in a chemical vapor deposition system as depicted in FIGS. 1A and 2.

Thus, four separate lines are input to the burner 220: a line conveying a mixture of vaporized $SiCl_4$ and $O_2$, a line conveying $H_2$ or another convenient fuel gas, a line conveying $O_2$ for the combustion of hydrogen, and a line conveying $O_2$ to shield the $SiCl_4$ and $O_2$ mixture. Preferably, a fixed ratio of $H_2$ to $O_2$ is maintained, such as two-to-one $H_2$ by volume. In one preferred embodiment, the fixed ratio of $H_2$ to $O_2$ is three-to-one, due to the higher effective deposition rate that is observed. FIG. 3A depicts a preferred embodiment of a burner 220, 300 for use in the deposition system 100, 200. The burner 300 preferably receives the four streams, and emits preferably four streams from a burner face 302, each stream being emitted from one of at least four concentric rings 304, 306, 308, 310 of emission holes.

Figure 3B:
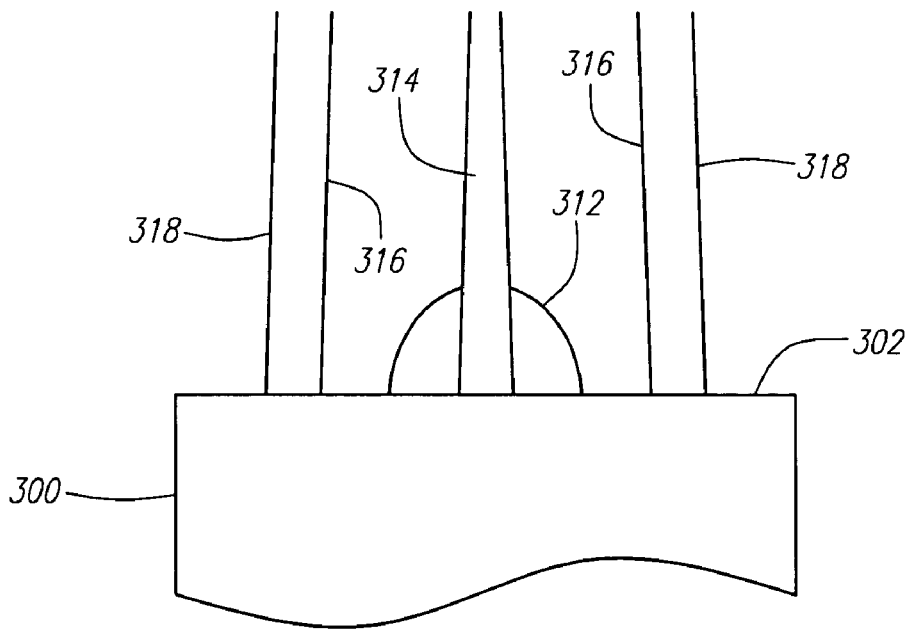
FIG. 3B is a side view of burner and a representative stream of emissions from the burner, which is depicted generally in FIG. 2, as is preferably provided in a chemical vapor deposition system as depicted in FIGS. 1A and 2.

As illustrated in the side view of the burner 300 in FIG. 3B, the innermost ring 304 of holes is provided to emit the chemical stream 314 of vaporized $SiCl_4$ and $O_2$. The second ring 306 preferably streams $O_2$ alone. As shown in FIG. 3B, this inner $O_2$ ring 306 acts as an inner shield 312 to prevent the oxidation reaction of the $SiCl_4$ into $SiO_2$ too close to the burner face 302, which would eventually cause a build-up of glass soot at the burner face 302. The third concentric ring 308 of holes emits a stream 316 of the fuel gas, preferably $H_2$. The fourth (outer) ring 310 of holes preferably emits a stream of $O_2$, often referred to as the fuel oxygen 318, which is used in the combustion process and to control the shape of the flame.

As the constituents are emitted from the burner 300, the fuel gas and the oxygen are ignited. The $SiCl_4$ particles react in the flame at a controlled distance away from the face of the burner 300. The $SiCl_4$ particles passing through the flame are oxidized to form silica soot that continue in a directed stream toward a workpiece 224 that may initially be in the form or a start rod. As silica soot approaches the workpiece 224, the silica soot has a temperature on the order of about 1100° C. The chlorine is preferably separated from the other materials and combines with hydrogen to ultimately form hydrochloric fumes (HCl). These reactions generally apply to the deposition process for a cladding on an optical fiber preform. Other constituents may be used for chemical vapor deposition for other applications applying the different embodiments and aspects of the chemical vapor deposition system described herein.

Figure 4:
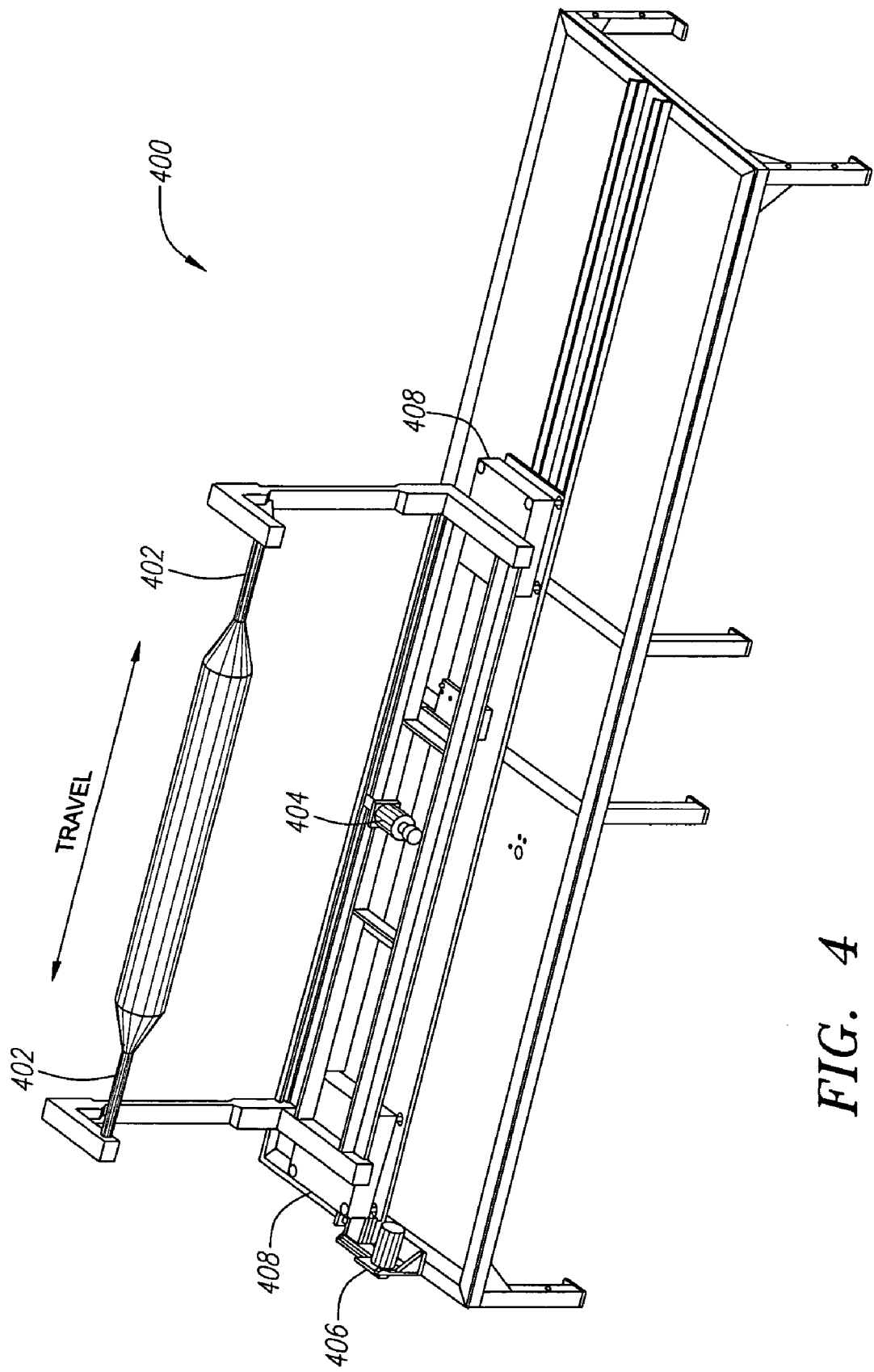
FIG. 4 is a schematic diagram providing a perspective view of a preferred embodiment of a lathe, such as is generally depicted in FIG. 2, for holding and moving a workpiece in a chemical vapor deposition system as is depicted in FIGS. 1A and 2.

Referring again to FIG. 2, the silica soot is deposited in layers on a continuously moving workpiece 224. The workpiece 224 is mounted on the lathe 222, which preferably rotates and translates the workpiece 224 relative to the burner 220. As shown in FIG. 4, the lathe 222, 400 preferably includes end holders 402 into which the ends of the workpiece 224 (e.g., the start rod) are inserted. The lathe 400, 222 further includes at least one and preferably two motors 404 and 406 for moving the workpiece 224 relative to the burner 220 both rotationally and translationally. The motors 404, 406 are preferably controlled by a computer 210, such as that depicted in FIG. 2, for controlling the speed of rotation and translation of the workpiece 224 throughout the course of the deposition process on the workpiece 224.

Figure 5:
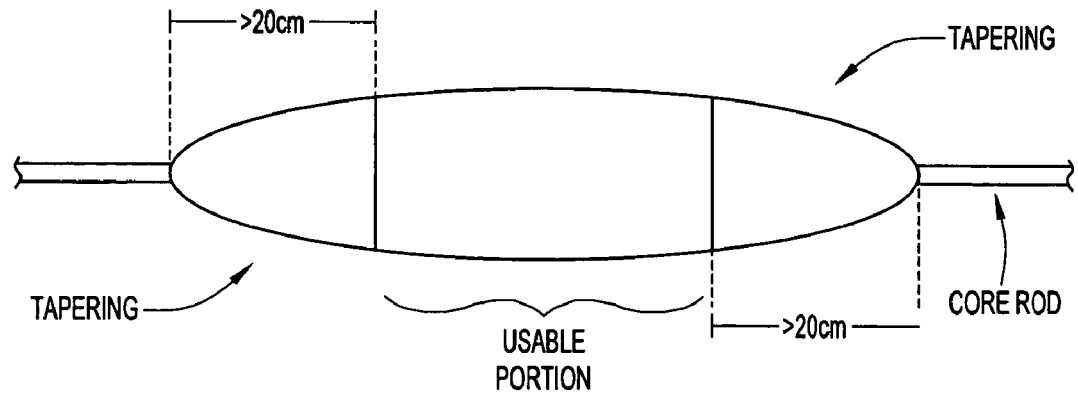
FIG. 5 is a diagram depicting an example of a final preform having a usable portion demonstrating a tapering effect at the ends of the preform.

In one preferred embodiment, a particular translation characteristic is applied to the workpiece to minimize a slow tapering effect on the resulting workpiece 224. This tapering effect, or "footballing," as illustrated in FIG. 5 may cause a loss of significant portion of the useful length of the preform when the preform is finally ready for drawing. Because of the need to maintain the proper diameter ratios for the core and cladding in the final preform, the tapering effect in the deposition of soot on the workpiece 224 causes a significant length at the ends of the final preform to be unusable, or if used, typically results in a degraded quality of optical fiber. Generally, the unusable portion may be more than about 20 cm at each end of the preform.

Figure 6:
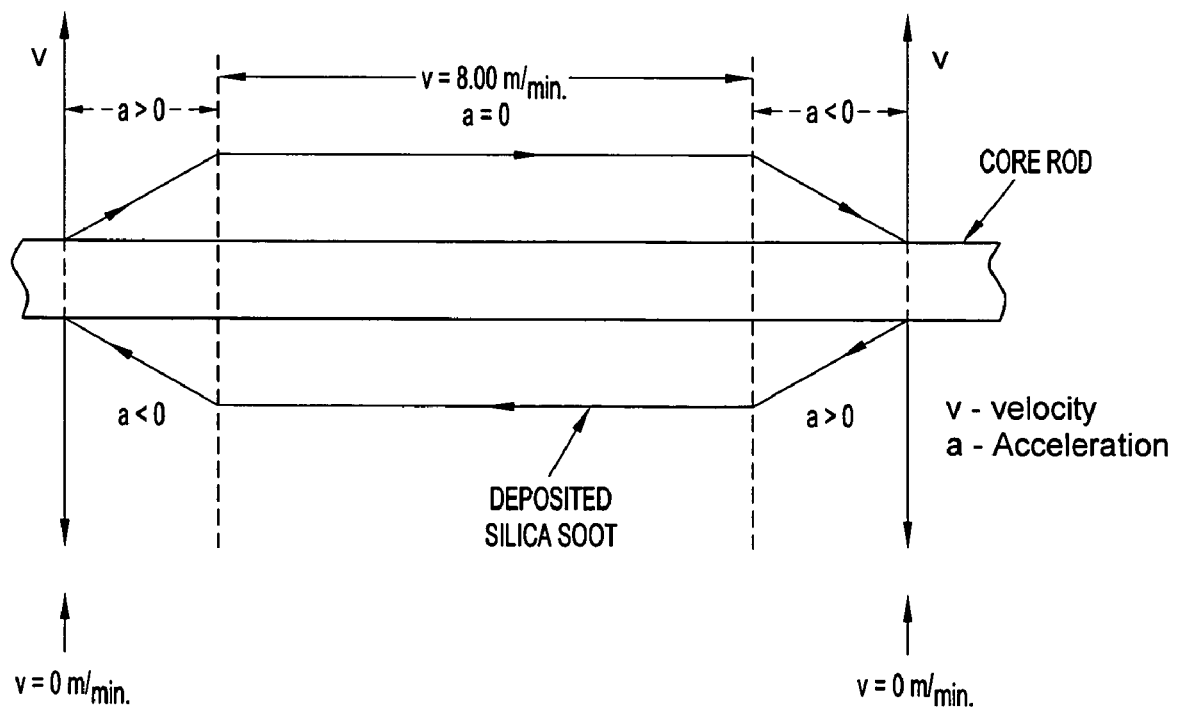
FIG. 6 is a diagram depicting a motion profile of the translational movement of a workpiece relative to a chemical deposition burner.

The tapering effect may be substantially reduced by translationally moving the workpiece 224 at a maximum speed of greater than about 1.4 meters per minute, and preferably greater than about seven (7) meters per minute during at least a part of the deposition process, and preferably after the first several deposition passes have been completed. In one embodiment, the lathe 222, 400 translationally moves the workpiece 224 according to a motion profile, an example of which is depicted in FIG. 6. In FIG. 6, the example shows a motion profile where the maximum velocity is eight (8) meters per minute. Preferably, as the ends of the workpiece approach the burner, the workpiece decelerates at a constant deceleration (e.g., −250 mm/sec$^2$) and then accelerates with an opposite constant acceleration (e.g., 250 mm/sec$^2$). Preferably, the maximum speed and acceleration is limited only by the stress limitations of the workpiece caused by such motion. Applying such a motion profile, the unusable portion at each end of the final preform may be significantly reduced.

The positive effect on the workpiece 224 due to the increase in its translational speed may be explained by several factors. First, because of the change in direction of the motion at the ends of the workpiece 224, the workpiece 224 at the ends tends to be hotter than at other locations. Greater heat at one location tends to cause the soot on the workpiece 224 to densify more substantially than at other locations where the temperature is lower. This densification results in a smaller diameter workpiece 224 at these locations. The smaller diameter translates into a smaller target for the streaming silica soot, and because a smaller target results in lower collecting efficiency, the deposition rate at the ends is reduced, thus increasing the tapering affect.

Second, the additional heat at the ends of the workpiece 224 generally decreases the temperature gradient between the silica soot particles and the workpiece 224, and thereby, decreases the thermophoretic effect. The reduction in the thermophoretic effect causes a reduction in the deposition efficiency at the ends of the workpiece 224. The diameter at the ends therefore increases even more slowly than at other locations on the workpiece 224.

By translating the workpiece at speeds above a certain threshold, preferably the workpiece 224 at no location exceeds a predetermined temperature, and therefore the cumulative effect of the above factors is greatly reduced. The result of a reduced "footballing" effect translates into a larger useful preform and a substantially increased effective deposition rate.

With respect to the rotation of the workpiece, in one embodiment, the workpiece is rotated at a speed of greater than about 60 rotations per minute (RPM) to maintain a substantial thermophoretic effect between the soot particles and the workpiece. In a preferred embodiment, the speed of rotation is randomly varied between about 60 RPM and 80 RPM on each translational pass over the burner to reduce a potential for "a rippling effect" in the layering of soot on the workpiece.

Figure 7:
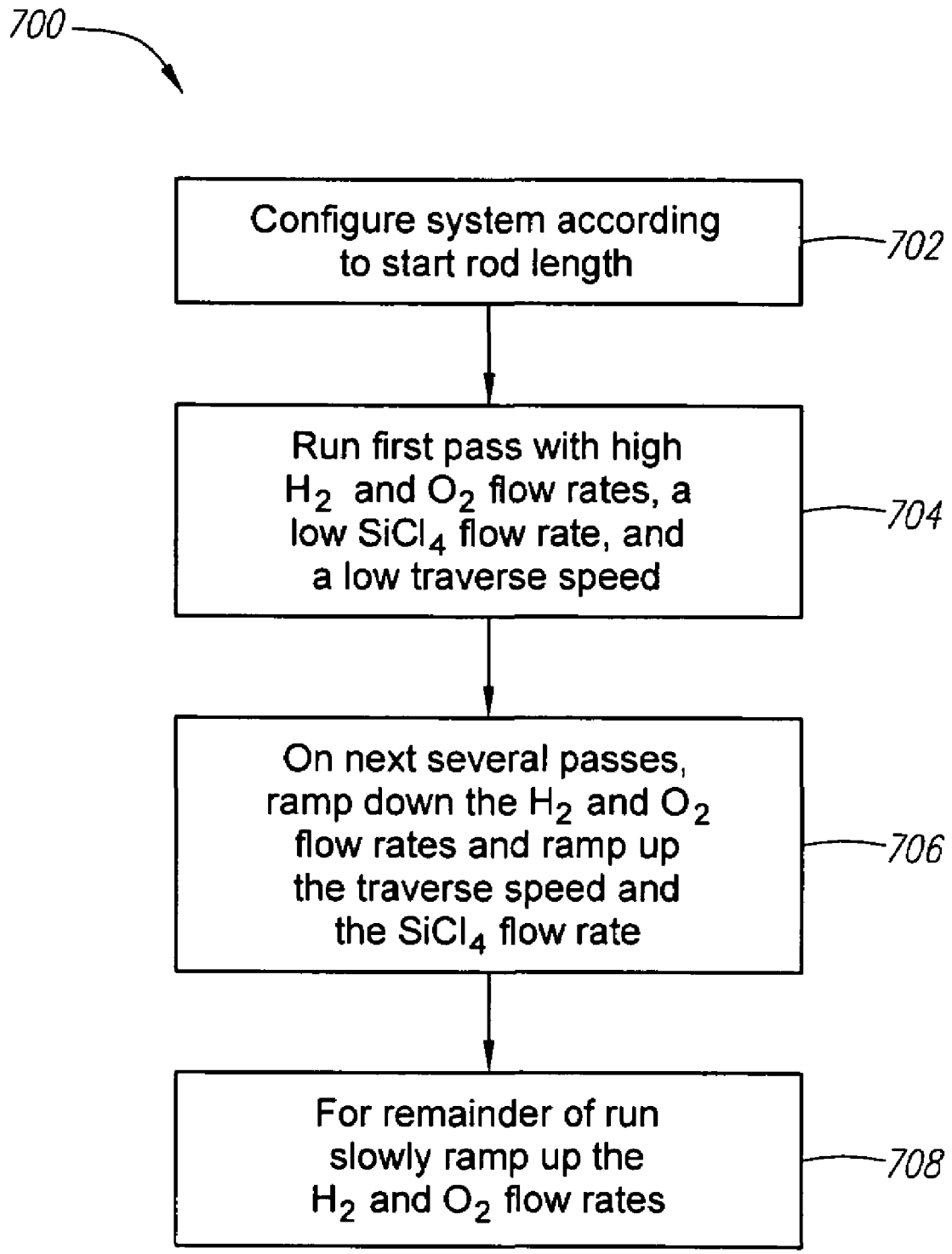
FIG. 7 is a process flow diagram illustrating a preferred embodiment of a process of performing chemical vapor deposition such as may be performed by the chemical vapor deposition system illustrated in FIG. 1A.

FIG. 7 depicts a preferred embodiment of a process 700 of performing chemical vapor deposition such as may be performed by the chemical vapor deposition system 100 illustrated in FIG. 1A. Optionally, in a first step 702, a length for a start rod is set. In different runs of the vapor deposition system, start rods of various lengths, preferably between about 0.8 meters and about 2 meters, may be used. Preferably, a length of a start rod is input at an operator terminal and transmitted to a computer. The computer then communicates with components of the deposition system that have functions dependent on the start rod length. Specifically, the lathe may be programmed according the length of the start rod that is used for a particular run of the deposition process 700. When the lathe receives the length value from the computer, the torch at one end of the lathe is preferably automatically repositioned to apply heat to one end of the rod. The other torch is preferably stationary. Furthermore, the motor controlling the translation of the rod executes a traverse motion profile that reflects the entered length of the start rod.

In a next step 704, a first pass of depositing silica soot is performed with a high flow of fuel gas and oxygen from the chemical burner relative to the flow of $SiCl_4$. As one example, the flow rate of $H_2$ may be about 300 standard liters per minute, with $O_2$ at about 100 standard liters per minute, and $SiCl_4$ at about 25 grams per minute. Furthermore, on this first pass the traverse speed is relatively low, preferably at about 0.5 meters/minute. The resulting high heat of the soot stream and of the workpiece on this first pass hardens the initial interfacial layers between the start rod and the cladding layers that are subsequently deposited, preferably preventing interface defects and slippage of the soot over the start rod.

During the first pass and throughout a run of a deposition process 700, certain parameters are preferably fixed throughout the run. Specifically, the end torches at each end of the start rod provide a flame that preferably provides a source of heat. The end torches provide heat at the ends of the workpiece to prevent the soot from cracking and to eliminate the soot slippage over the start rod during sintering, by keeping the ends denser and tightly adhered to the handle glass. The rod should be hot enough to affix the ends of the soot to a particular point on the start rod. However, if the end burners provide too much heat, then generally the start rod bends. Furthermore, to enhance the effective deposition rate, a fixed distance between the torch and the workpiece is preferably maintained throughout the run. Thus, as the workpiece increases in diameter, the chemical burner preferably retreats from the axial center of the workpiece in conformance with the increase in diameter of the workpiece.

In a next step 706, the traverse speed of the workpiece is ramped up, preferably to a maximum speed exceeding seven meters per minute. Furthermore, the flow rates of fuel gas and oxygen from the chemical burner are ramped down and the flow rate of $SiCl_4$ is slowly increased.

In a next step 708, the flow rates of the fuel gas and oxygen are ramped up slowly. Consequently, the density of the workpiece is slowly decreased to near a threshold density, below which the workpiece may begin to crack or break. This threshold density is preferably approached to maximize the effective deposition rate. For example, in the deposition of silica soot for optical fiber preforms, the workpiece generally cracks at densities below about 0.3 grams/cm$^3$. However, to maximize the effective deposition rate, the density is preferably maintained near the about 0.3 grams/cm$^3$ threshold. The approach of the threshold minimum density, however, is preferably approached gradually to minimize the potential for bubbles trapped in the preform.

While preferred embodiments of the invention have been described herein, and are further explained in the accompanying materials, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A method of depositing silica particles onto a workpiece comprising the steps of:
   (a) obtaining a workpiece;
   (b) depositing silica particles on the workpiece;

(c) translating the workpiece relative to the depositing of silica particles; wherein the translating step is performed by selectively translating the workpiece relative to the deposition at a rate greater than about 3.0 meters per minute; and (d) selectively causing a relative acceleration between an end of the workpiece and the deposition, the relative acceleration having an absolute magnitude of at least about 250 mm/sec$^2$.

2. The method of claim 1, wherein the depositing step further comprises a step of rotating the workpiece.

3. The method of claim 1, wherein the workpiece is translated according to a motion profile.

4. The method of claim 1, wherein the workpiece is selectively translated at a rate of at least about seven meters per minute.

5. The method of claim 1 wherein the silica is doped silica.

6. A method of depositing silica particles onto a workpiece comprising the steps of:

(a) obtaining a workpiece;

(b) depositing silica particles on the workpiece;

(c) translating the workpiece relative to the depositing of silica particles; wherein the translating step is performed by selectively causing a relative translation between the workpiece and the deposition of greater than about 3.0 meters per minute; and (d) selectively causing a relative acceleration between an end of the workpiece and the deposition, the relative acceleration having an absolute magnitude of at least about 250 mm/sec$^2$.

7. The method of claim 6, wherein the depositing step further comprises a step of rotating the workpiece.

8. The method of claim 6, wherein the workpiece is translated according to a motion profile.

9. The method of claim 6, wherein the relative translation between the workpiece and the deposition is selectively greater than about seven meters per minute.

10. The method of claim 6 wherein the silica is doped silica.

* * * * *